United States Patent [19]

Igarashi et al.

[11] Patent Number: 4,791,504
[45] Date of Patent: Dec. 13, 1988

[54] TAPE CASSETTE WITH LID LOCK AND TAPE CHARACTERISTIC INDICATING MEMBER

[75] Inventors: Tadao Igarashi; Takashi Oogi, both of Miyagi, Japan

[73] Assignee: Sony Corporation, Tokyo, Japan

[21] Appl. No.: 81,983

[22] Filed: Aug. 5, 1987

[30] Foreign Application Priority Data

Sep. 11, 1986 [JP] Japan .............................. 61-39665[U]
Sep. 11, 1986 [JP] Japan .............................. 61-39666[U]
Oct. 24, 1986 [JP] Japan .............................. 61-63285[U]

[51] Int. Cl.$^4$ .................. G11B 23/087; G11B 19/04; G11B 19/12
[52] U.S. Cl. .................................... 360/132; 360/60; 242/198; 242/199
[58] Field of Search .............................. 360/60, 132; 242/197–199

[56] References Cited

U.S. PATENT DOCUMENTS 4,041,537 8/1977 Kishi ..................................... 360/60
4,214,719 7/1980 Kato ..................................... 242/198
4,556,153 12/1985 Takagi et al. ..................... 360/132 X

FOREIGN PATENT DOCUMENTS 0169546 1/1986 European Pat. Off. ............ 360/132

Primary Examiner—Stuart N. Hecker
Assistant Examiner—Benjamin E. Urcia
Attorney, Agent, or Firm—Curtis, Morris & Safford

[57] ABSTRACT

A tape cassette has a cassette casing in which reels and a tape wound thereon are accommodated, a lid for closing a front opening of the casing, a lid-locking member pivoted on a mounting pin which projects from a pedestal on the bottom of the cassette casing, and detecting holes in the casing bottom with respective obstruction or indicating members for providing information as to the cassette, with one of the detecting holes being arranged substantially under the pedestal in alignment with the mounting pin without interfering with the mounting pin, so that the full area of the bottom of the casing is effectively utilized.

9 Claims, 11 Drawing Sheets

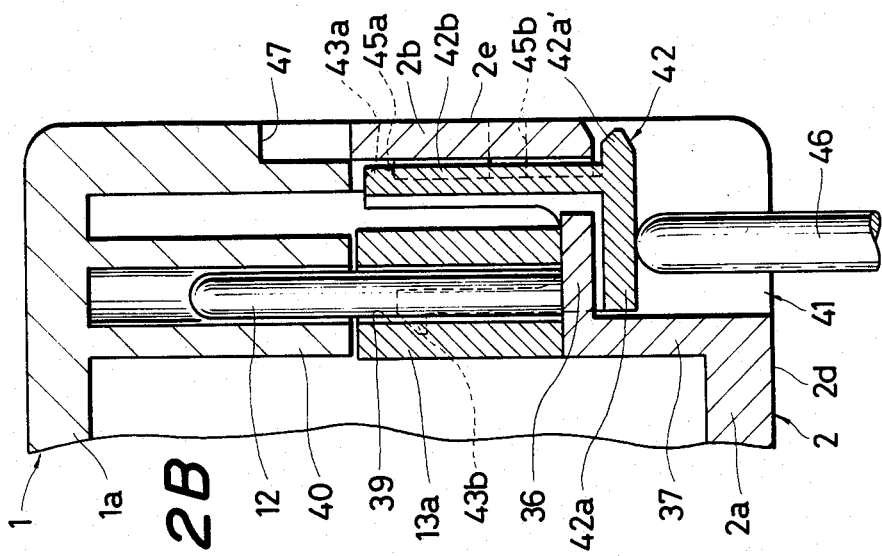
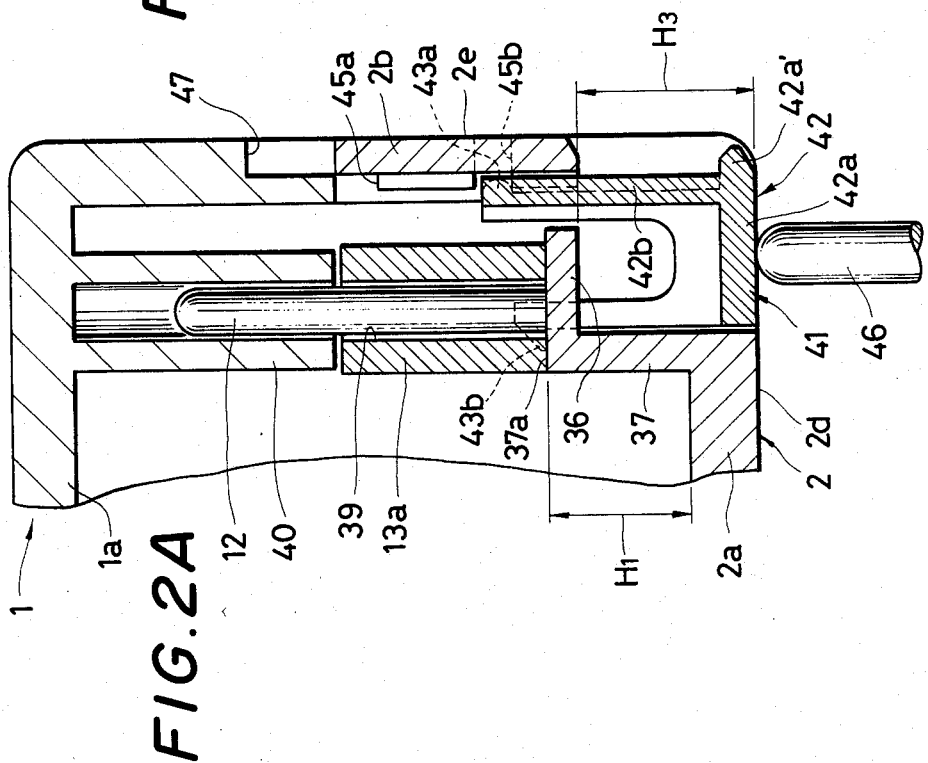
FIG.2A
FIG.2B

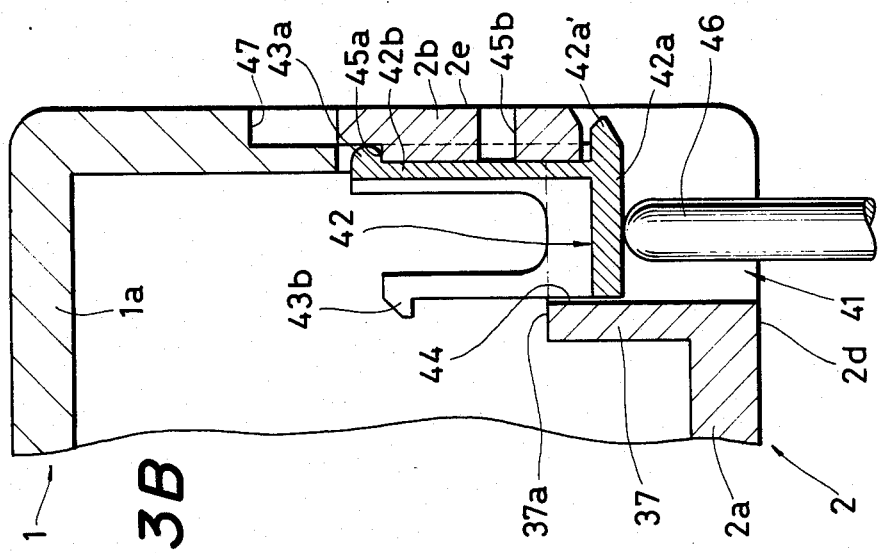
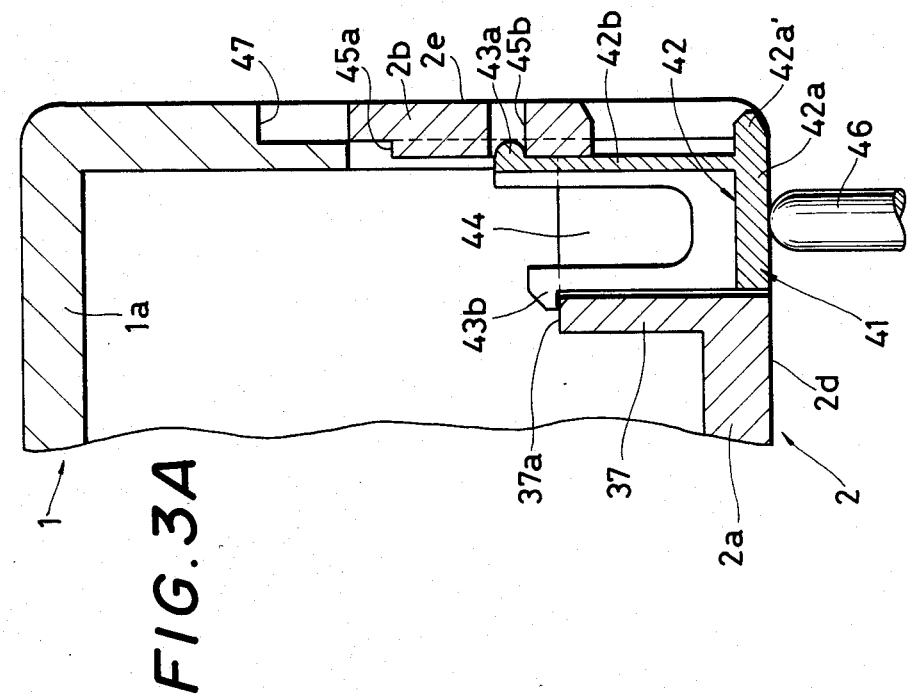

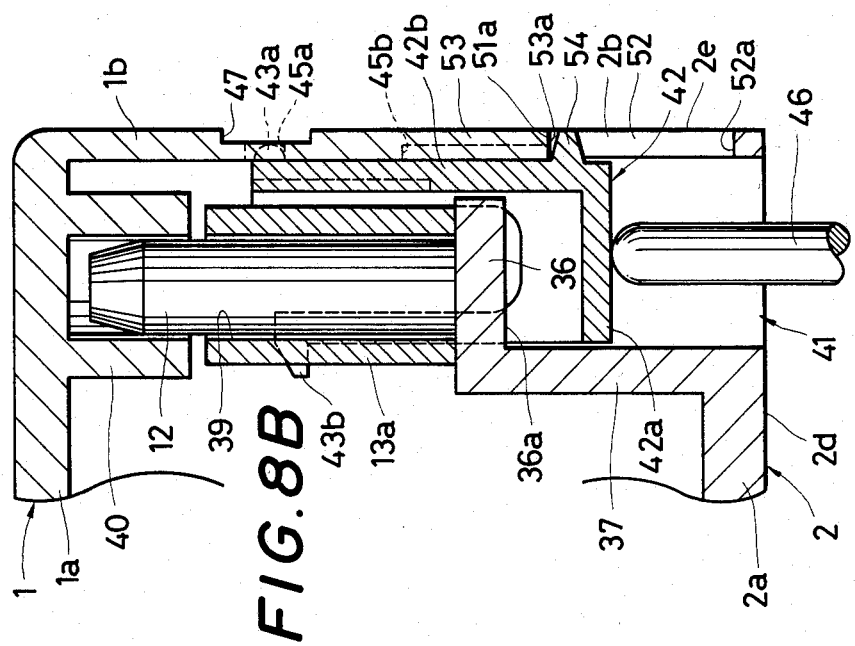
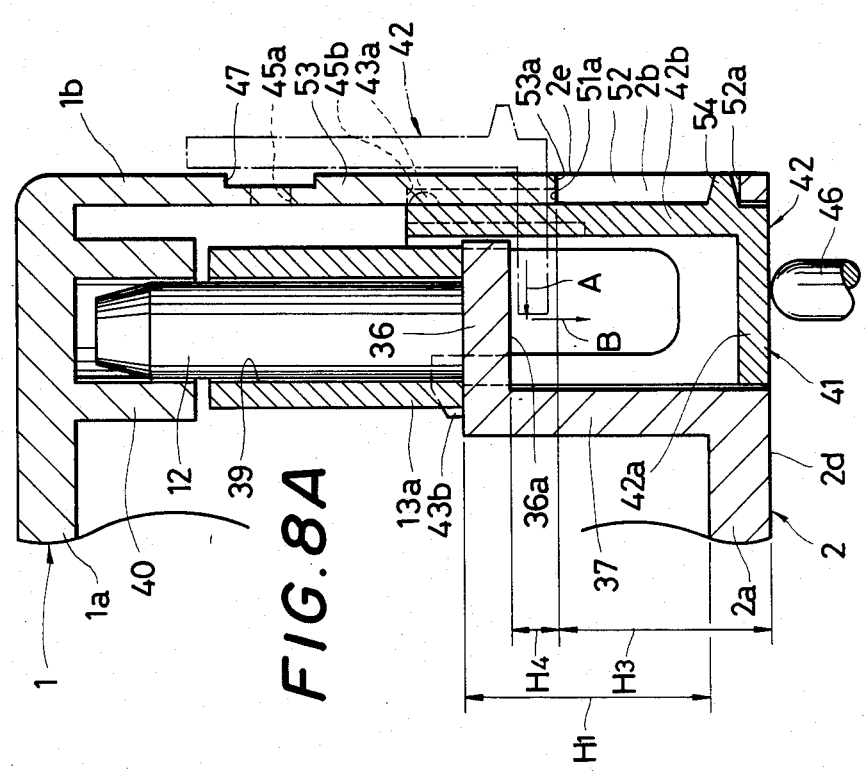

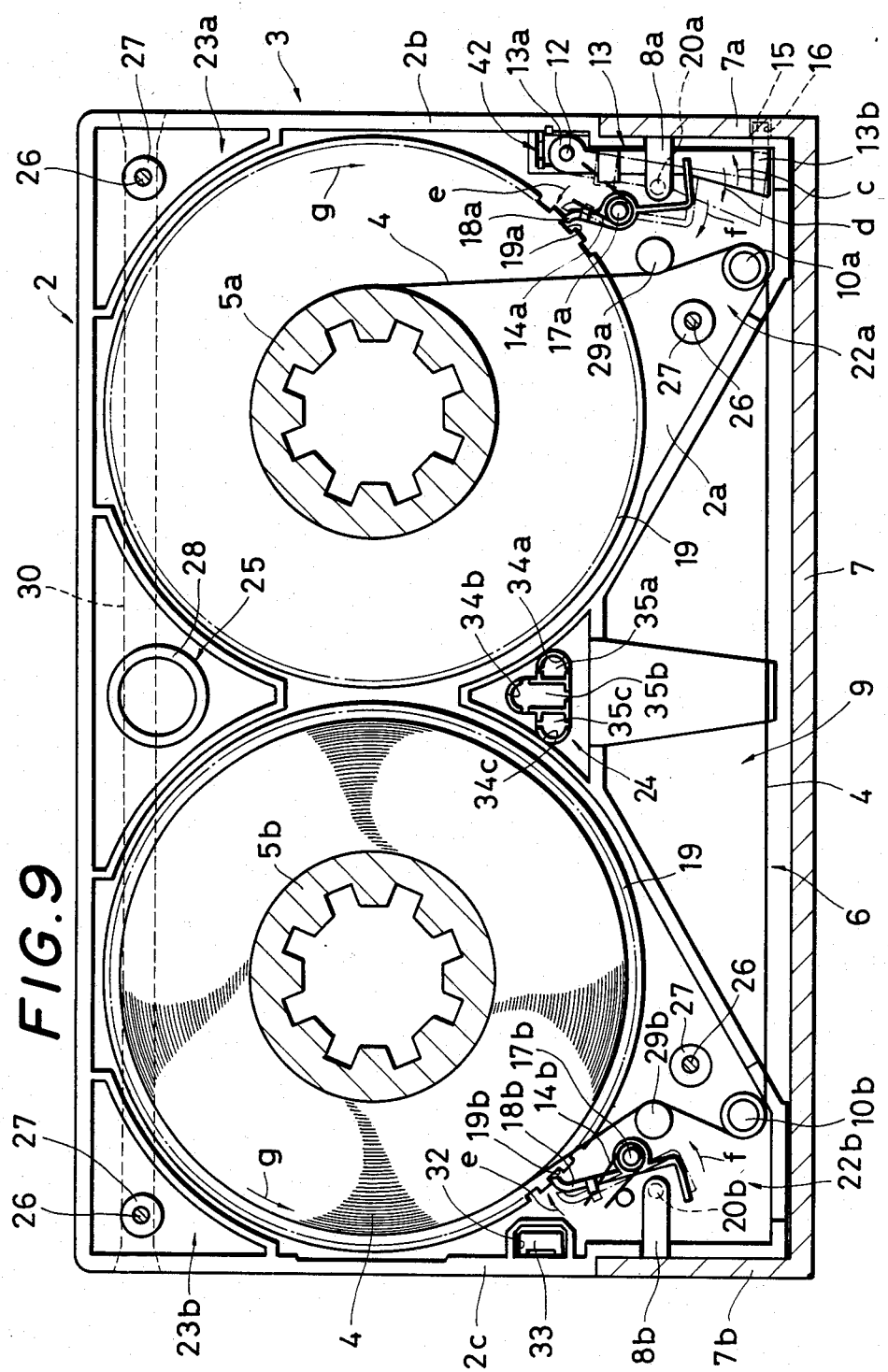

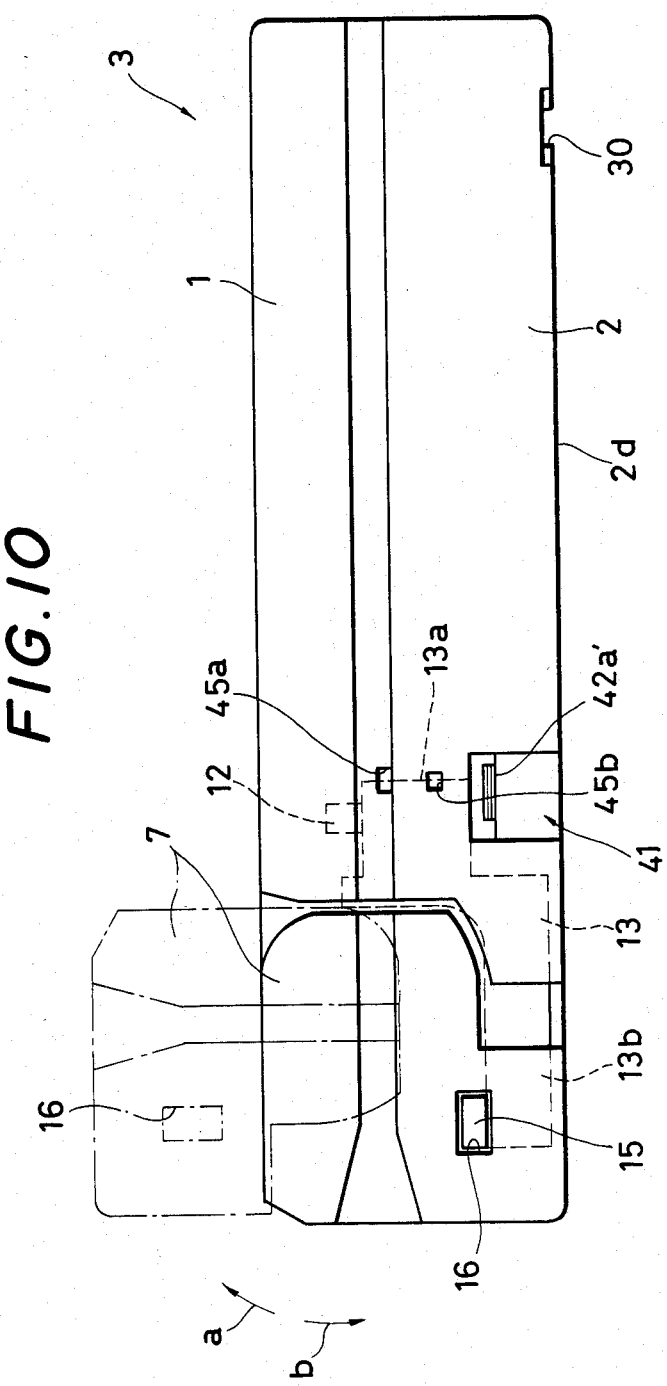

TAPE CASSETTE WITH LID LOCK AND TAPE CHARACTERISTIC INDICATING MEMBER

BACKGROUND OF THE INVENTION

1. Field of the Invention

This invention relates generally to a tape cassette of the type in which detecting holes with respective obstruction or indicating members are provided in the bottom of the cassette casing so as to make it possible to retrieve or determine information as to the tape cassette and the tape therein. The invention has particular, though not exculsive application, to a tape cassette for a video tape recorder.

2. Description of the Prior Art

It is known to provide tape cassettes for video tape recorders wherein detecting holes with respective obstruction or indicating members are provided in the bottom wall of the tape cassette casing so as to make it possible to retrieve or determine information therefrom as to the tape cassette and the tape therein, such as information as to the kind of tape, the thickness of tape and the like, and further to achieve the prevention of erroneous erasure.

In a tape cassette of the described kind, each of the detecting holes is opened or is closed by means of the respective obstruction member beforehand on the basis of predetermined information, and when the tape cassette is mounted in the video tape recorder, such predetermined information is retrieved by detecting pins provided in the video tape recorder in order to detect whether the respective detecting holes are opened or are closed by the obstruction members. More particularly, if the detecting hole is closed, the detecting pin abuts against the obstruction member and is lowered against the force of a resilient member or material, and if the detecting hole has been opened, the detecting pin is fitted into the detecting hole and is unaffected, so that the necessary information is retrieved with reference to any change in the height of the detecting pin.

Accordingly, the detecting hole must have a depth sufficient to receive the detecting pin and, if the obstruction member is also moved up and down along the detecting hole as in the prior art, the detecting hole must also have a depth sufficient to accommodate the stroke of the obstruction member. Thus, the detecting holes with respective obstruction members must be disposed only in those limited spaces free from the other necessary parts accommodated in the tape cassette, such as, the tape, tape reels, tape guides, various mounting pins and so on. In the prior art, detecting holes with the obstruction members have been provided within a triangular space located just to the rear of a central portion of a trapezoidal bottom opening or cutout in the bottom wall of the cassette casing so as to avoid interference with the tape reels.

Recently, there has been a tendency to increase the necessary information as to the tape cassette and the tape therein, so that it has become necessary to provide as many as possible of the detecting holes with respective obstruction members in the bottom wall of the cassette casing. However, there is a limitation on increasing the number of detecting holes as mentioned above.

OBJECTS AND SUMMARY OF THE INVENTION

Accordingly, it is an object of the present invention to provide a tape cassette wherein a detecting hole with a obstruction member is provided in the bottom of the tape cassette substantially in alignment with a mounting pin for a lid-locking member in such a way as to avoid any interference with the function thereof in order to effectively utilize the bottom space of the tape cassette and increase the amount of information that can be determined in respect to the tape cassette.

Another object of the invention is to provide a tape cassette wherein an obstruction or indicating member for a detecting hole is guided along an axial bore in a mounting pin for a lid-locking member when the detecting hole is opened or closed, in order to ensure that the obstruction member move smoothly up and down within the detecting hole.

A further object of the present invention is to provide a tape cassette wherein an obstruction member movable up-and-down in a detecting hole is firmly positioned with positioning means and presser means in its lower position where the detecting hole is closed, so that when the tape cassette is mounted in a video tape recorder or the like, the obstruction member is not inadvertently pushed up and unexpectedly raised by a detecting pin provided in the video tape recorder or the like, but the detecting pin is surely pressed down by the obstruction member, so that such information that the detecting hole has been closed, is always exactly retrieved.

Still a further object of the present invention is to provide a tape cassette wherein an up-and-down movable obstruction member is moved down within the respective detecting hole in order to close the detecting hole, and a stop projecting from the obstruction member comes in contact with the bottom of a U-shaped notch which is provided in the lower half of the tape cassette, and is prevented from moving further downward, so that the obstruction member can not be inadvertently removed from the detecting hole even if the obstruction member is forcibly lowered.

In accordance with an aspect of this invention, a tape cassette having a casing constituted by an upper half and a lower half and accommodating a pair of reels around which a tape is wound, further comprises a lid for closing a front opening across which the tape runs between the reels; a pedestal structure in the lower half of the casing and defining a support surface spaced upwardly from the bottom of the casing; a mounting pin projecting upwardly from the pedestal; a lid-locking member pivoted on the mounting pin and being operative to lock the lid; a detecting hole disposed under the pedestal; and an obstruction or indicating member movable in said detecting hole for indicating a condition of the tape cassette by its position in respect to said hole.

In preferred embodiments of this invention, the obstruction member is guided for up-down movements by an axial bore formed in the mounting pin, and is held by a retaining mechanism in both positions where the detecting hole is opened and closed. Further, a stop is desirably disposed disposed on the obstruction member for contact with the bottom of a notch provided in the lower half of the casing so as to surely avoid removal of the indicating member from the detecting hole when the indicating member comes to the position where the detecting hole is closed.

The above, and other objects, features and advantages of this invention, will be apparent in the following detailed description of illustrative embodiments thereof which are to be read in connection with the accompanying drawings wherein like reference numerals identify the corresponding parts in the several views.

BRIEF DESCRIPTION OF THE DRAWINGS

FIGS. 2A and 2B are sectional views taken on the line II—II of FIG. 4;

FIGS. 3A and 3B are sectional views taken on the line III—III of FIG. 4;

FIGS. 8A and 8B are sectional views similar to those of FIGS. 2A and 2B, but showing the embodiment of FIG. 7A;

FIG. 9 is a plan view of a tape cassette without the upper half of the casing thereof and which incorporates the embodiment of the invention shown on FIG. 1; and FIG. 10 is a side view of the tape cassette shown in FIG. 9.

DETAILED DESCRIPTION OF PREFERRED EMBODIMENTS

Figure 1:
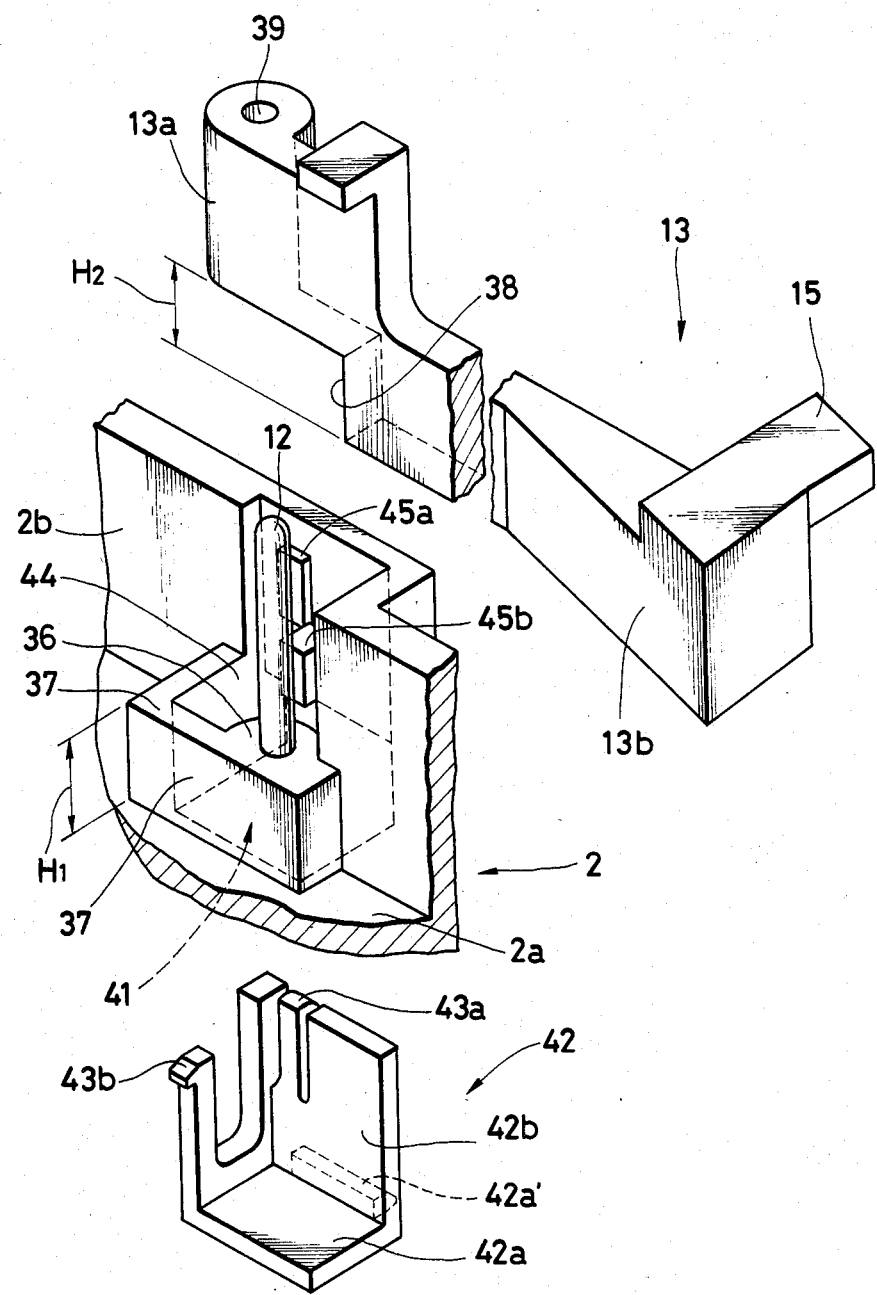
FIG. 1 is an exploded, perspective view of an essential part of a tape cassette according to a first embodiment of this invention.
Figure 4:
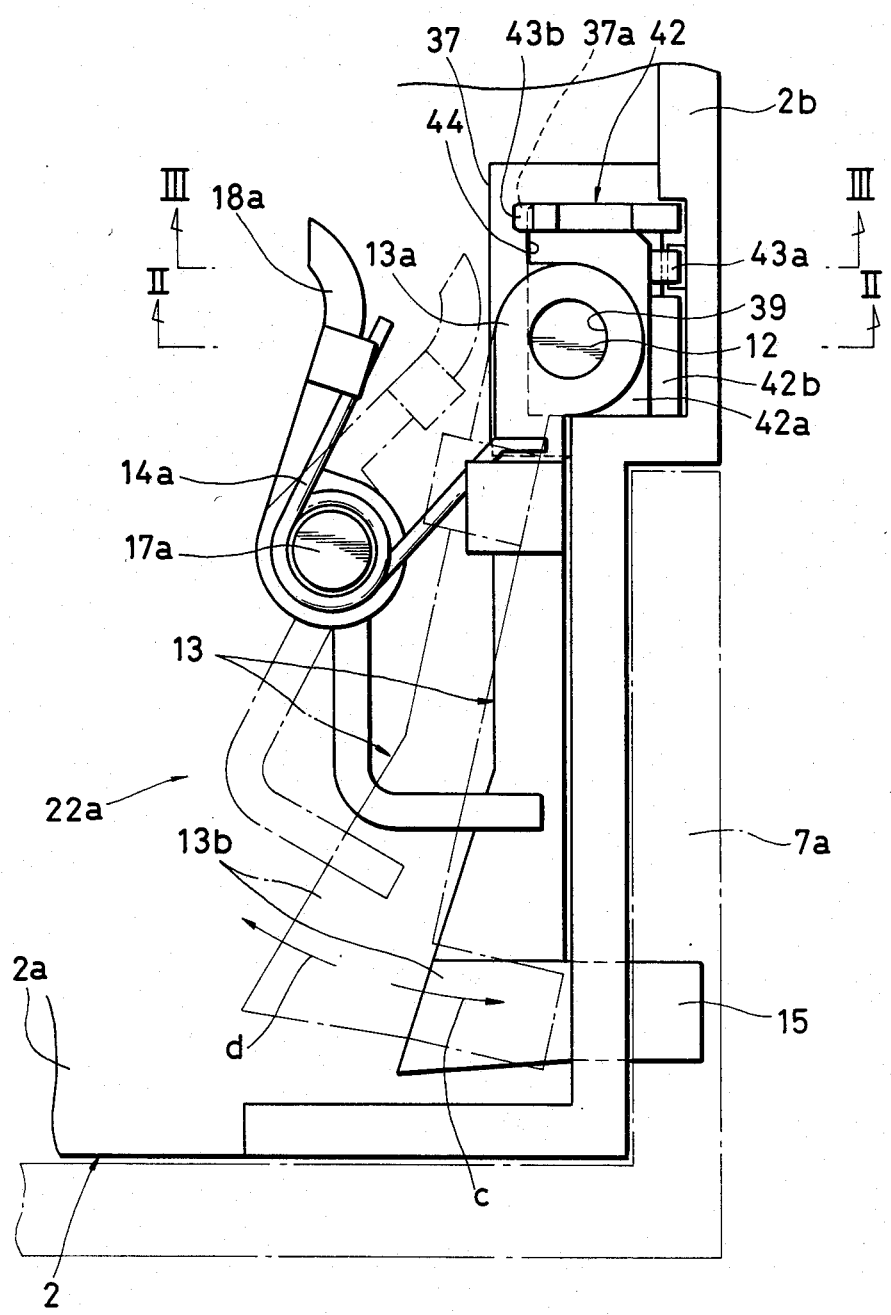
FIG. 4 is a plan view of the essential part of the tape cassette shown on FIG. 1.

Referring initially to FIGS. 9 and 10, it will be seen that a tape cassette of a type to which this invention may be advantageously applied comprises an upper half 1 and a lower half 2 molded from synthetic resin and which are assembled together to form a casing or body 3. Accommodated in the body or casing 3 of the tape cassette is a pair of right and left reels 5a and 5b, around which a magnetic tape 4 is wound.

A lid 7 for covering a front opening 6 provided in the body 3 of the tape cassette has a substantially channel-shaped section and is also molded from synthetic resin. The lid 7 is secured to the cassette body 3 by a pair of right and left pivots 8a and 8b which are formed integrally with the respective right and left end portions 7a and 7b of the lid 7, and is swingable in the direction of the arrows a and b in FIG. 10.

At the front side (the lower side as viewed in FIG. 9) of the bottom plate or wall 2a of the lower half 2, a substantially trapezoid-shaped cutout 9 is provided contiguous to the front opening 6, and the tape 4 between the reels is guided by a pair of right and left tape guides 10a and 10b disposed on the bottom plate 2a of the lower half 2 near gateways for the tape 4 which is thereby made to span the cutout 9 and to extend across the front opening 6.

A lid-locking member 13 includes a rear end portion 13a pivotally mounted on a mounting pin 12 which vertically projects from the bottom plate 2a of the lower half 2 within the cassette body 3, so that the member 13 is angularly movable in the direction of arrows c and d in FIG. 9. Further, the lid-locking member 13 is urged in the direction of arrow c by a spring 14a, so that a lock-pin 15 formed integrally with the member 13 at its front portion 13b, is urged to pass through a side plate 2b of the lower half 2. The lock-pin 15 is engaged with a lock-hole or keeper 16 disposed in the lid 7 so as to lock the lid 7 in its closed position as indicated in solid lines in FIG. 10.

When the tape cassette is mounted in a video tape recorder, the lid-locking member 13 is swung against the force of the spring 14a by an unlocking member (not shown) in the direction of arrow d in FIG. 9 from the position indicated in solid lines to an unlocked position indicated in chain-dotted lines, so that the lock-pin 15 is moved in the direction of arrow d and is withdrawn from the hole or keeper 16, so that the lid 7 may be swung in the direction of arrow a in FIG. 10 from the closed position indicated in solid lines to the opened position indicated in chain-dotted lines.

As shown in FIG. 9, a pair of right and left reel-locking members 18a and 18b are mounted on respective mounting pins 17a and 17b which project vertically from the bottom plate or wall 2a of the lower half 2 within the cassette body 3, and are swingable in the direction of arrows e. The reel-locking members 18a and 18b are urged in the direction of arrows e by the spring 14a and a similar spring 14b, respectively, which surround the respective mounting pins 17a and 17b, and members 18a and 18b are engageable with toothed portions 19a and 19b provided on the outer peripheries of the lower flanges of the right and left reels 5a and 5b, respectively, for preventing rotation thereof in the direction of the arrows g in FIG. 9, that is, in the directions for paying out the tape 4.

When the tape cassette is mounted in the video tape recorder and the lid 7 is swung in the direction of arrow a in FIG. 10, unlocking pins 20a and 20b formed integrally with the pivots 8a and 8b and extending downward therefrom as shown in FIG. 9 move the reel-locking members 18a and 18b in the directions of the arrows f against the forces of the springs 14a and 14b from the locking position indicated in solid lines to the unlocking position indicated in chain-dotted lines in FIG. 9, respectively, and the reels 5a and 5b are thereby unlocked or freed to rotate.

The only free areas on the bottom plate 2a of the lower half 2 around the pair of reels 5a and 5b, are a pair of right and left front corner spaces 22a and 22b, a pair of right and left rear corner spaces 23a and 23b, a front inter-reel space 24 located to the rear of the central portion of the cutout 9, and a rear inter-reel space 25 located in the rear of the front inter-reel space 24. In each of the four corner spaces 22a, 22b, 23a and 23b, there is a boss 27 which is formed integrally with the bottom plate 2a and into which a screw 26 if inserted for fastening together the upper half 1 and the lower half 2. In the rear inter-reel space 25, there is a boss 28 which is formed integrally with the bottom plate 2a and into which a corresponding boss provided in the upper half 1 is fitted. Further, in the front corner spaces 22a and 22b, there are the tape guides 10a and 10b, the mounting pins 17a and 17b, the reel-locking members 18a and 18b and a pair of intermediate tape guides 29a and 29b, respectively. In addition, in the right front corner space 22a, there are the mounting pin 12 and the lid-locking member 13.

As shown in FIG. 9, a lateral groove 30 for guiding the cassette in a cassette holder passes under the right and left bosses 27 and is disposed in the bottom face 2d of the lower half 2, so that detecting holes with respective obstruction members for indicating information as to the tape cassette and the tape 4 therein, can not be disposed in the rear corner spaces 23a and 23b and in the rear inter-reel space 25.

Hence, a detecting hole for indicating such information and an obstruction member breakable to open the detecting hole, for example, a detecting hole 32 and an obstruction member 33 for preventing erroneous erasure, are disposed near a side plate 2c of the lower half 2 in the front corner space 22b which is remote from the lid-locking member 13, as shown in FIG. 9. Further, as in the prior art, a plurality of detecting holes 34a, 34b and 34c with respective breakable obstruction members 35a, 35b and 35c are disposed in the front inter-reel space 24 as shown in FIG. 9.

Generally, in accordance with the present invention, still another detecting hole with an obstruction member, for example, for indicating the kind of tape which may be varied or for preventing erroneous erasure, is disposed in the front corner space 22a under the mounting pin 12 for the lid-locking member 13, in other words, in a position of substantial symmetry with respect to the detecting hole 32 with the obstruction member 33.

A first embodiment of this invention will now be described in detail with reference to FIGS. 1 to 4.

A pedestal 36 is spaced or stepped upwardly a predetermined height $H_1$ from the bottom wall or plate 2a of the lower half 2 and an upright portion 37 connecting the pedestal 36 to the bottom plate 2a are formed integrally with the bottom plate 2a, and the mounting pin 12 projects vertically upward from the pedestal 36.

A stepped portion or cutout 38 of height $H_2$, which is substantially the same as the height $H_1$, is provided in the lower part of the rear portion 13a of the lid-locking member 13. Thus, the lid-locking member 13 is swingable in the direction of arrows c and d in FIG. 4, when the mounting pin 12 is fitted into a hole 39 provided in the rear portion 13a of the member 13. Further, as shown on FIGS. 2A and 2B the top of the mounting pin 12 is fitted into a hollowed boss 40 depending from the top wall or plate 1a of the upper half 1 so as to have the mounting pin 12 firmly fixed.

For utilizing the space of height $H_3$ under the pedestal 36, a rectangular detecting hole 41 is provided in the bottom face 2d of the lower half 2, and also opens laterally through the side face 2e of the lower half 2. Further, an obstruction member 42 for closing the mouth of the detecting hole 41 which extends from the bottom face 2d to the side face 2e is fitted in the detecting hole 41.

The obstruction member 42 comprises a horizontal plate 42a for closing the horizontal portion of the mouth of the detecting hole 41 in bottom face 2d, a vertical plate 42b for closing the vertical portion of the mouth of the detecting hole 41 in side face 2e, and a pair of resilient positioning projections 43a and 43b, all of which are integrally molded from synthetic resin.

The obstruction member 42 can move up and down in the detecting hole 41, and the vertical plate 42b and the positioning projections 43a and 43b are inserted from below into a substantially L-shaped slot 44. The positioning projection 43a is selectively engaged in one or another of a pair of upper and lower positioning recesses 45a and 45b which are provided in the inner side of the side plate 2c of the lower half 2.

Thus, when the obstruction member 42 is lowered to its lower position as shown in FIGS. 2A and 3A, the mouth of the detecting hole 41 in the bottom plate 2a and the side plate 2b is closed by the horizontal plate 42a and the vertical plate 42b. At such time, the positioning projection 43a resiliently engages with the lower positioning recess 45b, and the other positioning projection 43b is captured by the top face 37a of the upright portion 37 of the bottom plate 2a, so that the obstruction member 42 is located and held in the predetermined lower position. The obstruction member 42 can be lowered by grasping the outer or distal end 42a' of the horizontal plate 42 by the user's finger nails or the like.

When the tape cassete is mounted in a video tape recorder and has its detecting hole 41 closed by the obstruction member 42, a detecting pin 46 provided in the video tape recorder is resiliently pressed down by the horizontal plate 42a of the obstruction member 42, as in FIG. 2A, so that information that the detecting hole 41 has been closed, is retrieved. Next, as shown in FIGS. 2B and 3B, when the obstruction member 42 is raised to its upper position, the mouth of the detecting hole 41 opening through the bottom plate 2a and the side plate 2b is simultaneously opened. At such time, the positioning projection 43a is disengaged from the lower positioning recess 45b and resiliently engages with the upper positioning recess 45a, and the obstruction member 42 is located and held in the upper position. The obstruction member 42 can be raised to the upper position by pushing up the horizontal plate 42a When the tape cassette is mounted in the video tape recorder with its detecting hole 41 opened, the detecting pin 46 fits into the open detecting hole 41, and information that the detecting hole 41 has been opened, is thereby retrieved. At such time, as the vertical portion of the mouth of the detecting hole 41 made through the side plate 2b has also been opened, the detecting pin 46 can be fitted into the detecting hole 41 in the lateral direction so as to retrieve the information mentioned above. Reference numeral 47 shown in FIGS. 2A to 3B denotes a horizontal guide groove provided in the side face 2e of the cassette body 3 and which is remote from the side opening to the detecting hole 41 and the obstruction member 42 therein.

Figure 5:
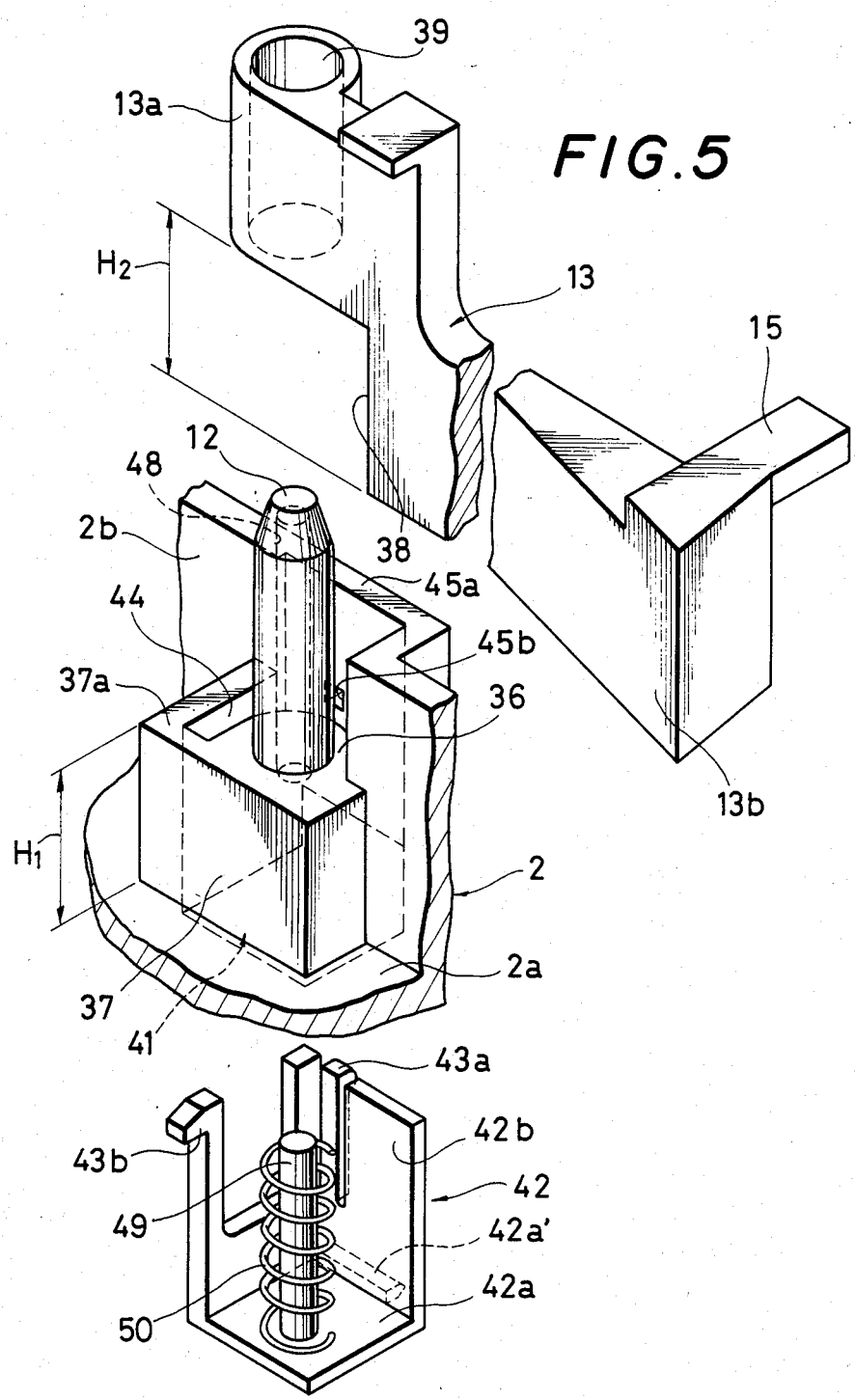
FIG. 5 is an exploded, perspective view of an essential part of a tape cassette according to a second embodiment of this invention.

Next, a second embodiment of this invention will be described hereinafter according to FIGS. 5, 6A and 6B.

In this embodiment, there is provided a guide bore 48 which passes through the pedestal 36 and extends along the axis of the mounting pin 12 in the central part thereof. The mounting pin 12 is formed integrally with the pedestal 36 and vertically projects from the top of the pedestal 36 as described in the first embodiment. On the other hand, there is provided a guide pin 49 formed integrally with the obstruction or indicating member 42 and vertically projecting from the top of the horizontal plate 42a of the obstruction member 42 in the substantially central part thereof. The guide pin 49 is inserted into the guide bore 48, and a spring 50 for always urging obstruction member 42 from its upper position to its lower position, surrounds the guide pin 49 and lies between the pedestal 36 and the horizontal plate 42a.

Figure 6B:
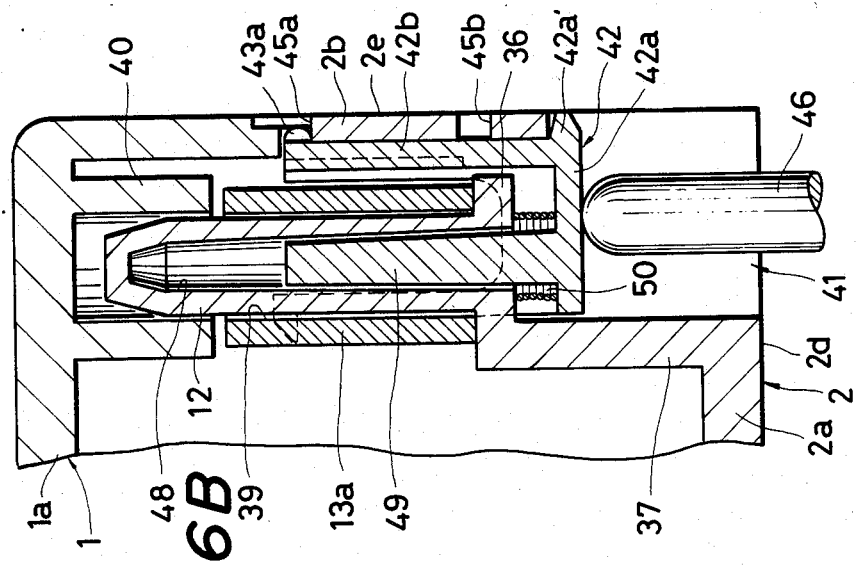
FIGS. 6A and 6B are sectional views similar to those of FIGS. 2A and 2B, but showing the embodiment of FIG. 5.
Figure 6A:
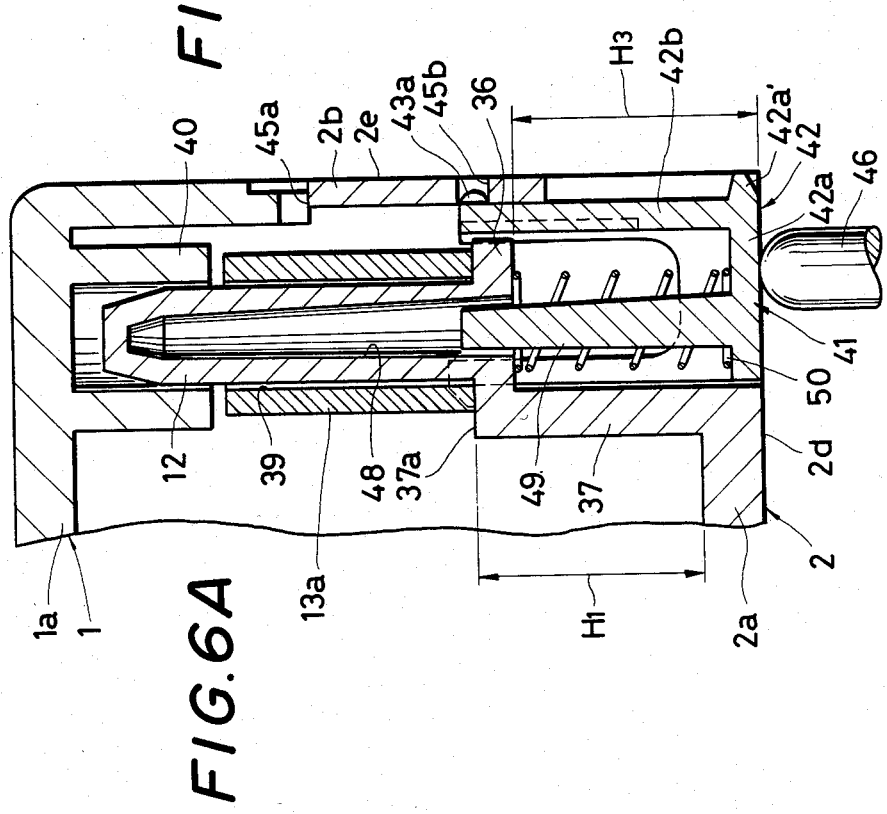
Figure 7A:
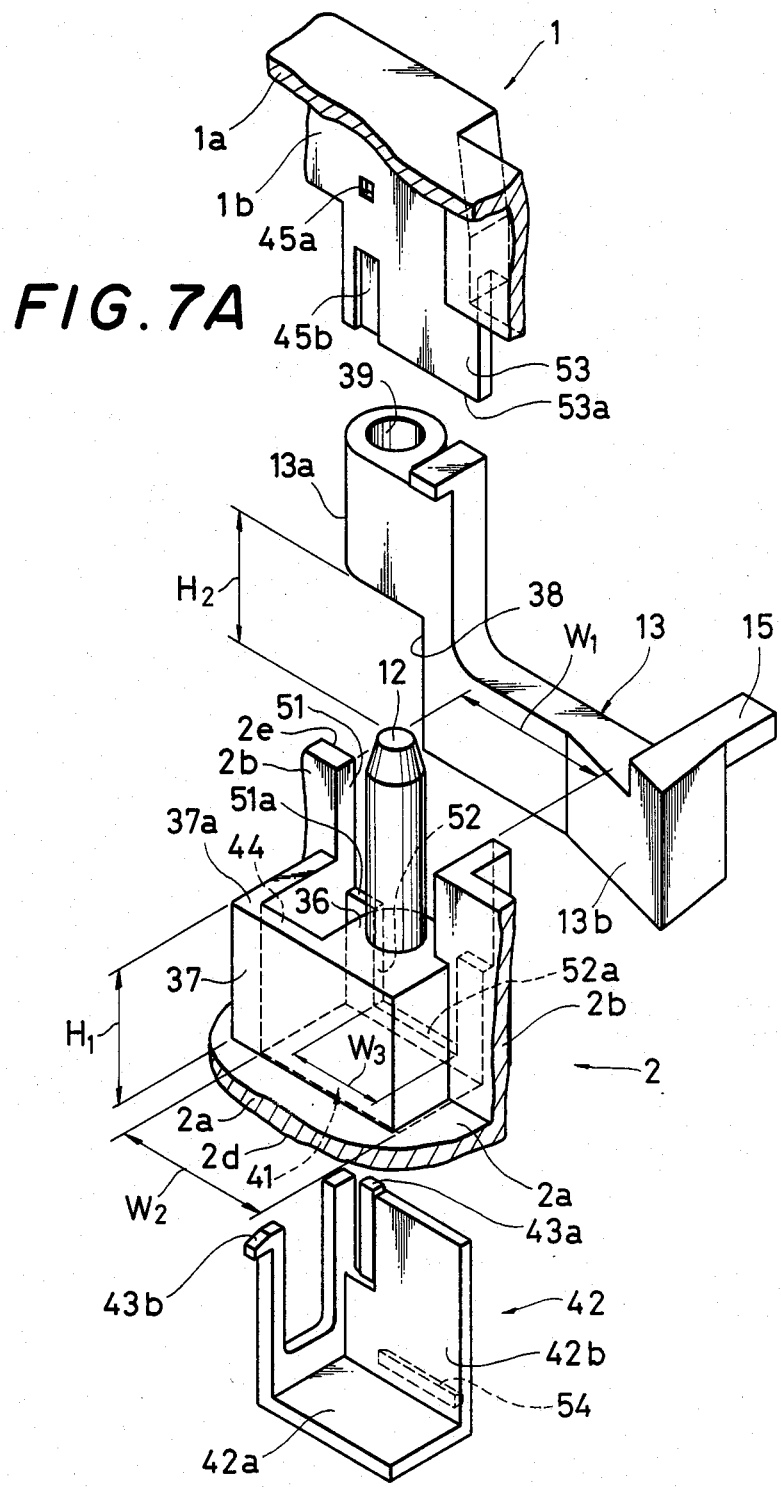
FIG. 7A is an exploded, perspective view of an essential part of a tape cassette according to a third embodiment of this invention.
Figure 7B:
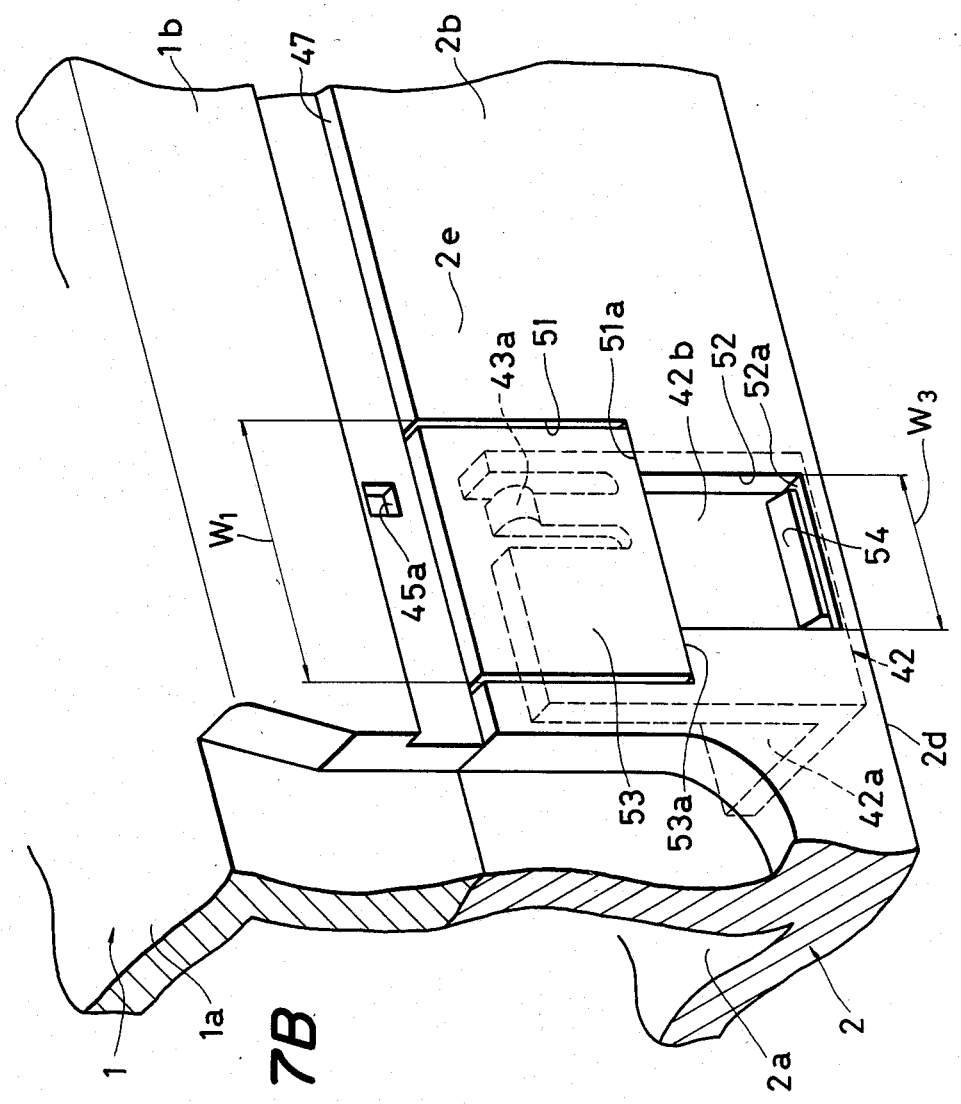
FIG. 7B is an enlarged perspective view of the assembled essential part of the tape cassette shown in FIG. 7A.

Thus, when the obstruction member 42 is lowered to its lower position as shown in FIG. 6A, the mouth of the detecting hole 41 opening through the bottom plate 2a and the side plate 2b is closed by the horizontal plate 42a and the vertical plate 42b. At such time, the positioning projection 43a resiliently engages with the lower positioning recess 45b, and the other positioning projection 43b is captured by the top face 37a of the upright portion 37 of the bottom plate 2a. Further, the obstruction member 42 is pressed down by the force of the spring 50. Hence, the obstruction member 42 is firmly positioned in its lower position, and the obstruction member 42 can be lowered to such position if only it is lowered a little to release projection 43a from recess 45a by grasping the distal end 42a' of the horizontal plate 42a with finger nails, because the spring 50 thereafter presses down the obstruction member 42 to its lowered position.

When the tape cassette is mounted in the video tape recorder with its detecting hole 41 closed by the obstruction member 42, as in FIG. 6A, the detecting pin 46 in the video tape recorder is resiliently pressed down by the horizontal plate 42a of the obstruction member 42, so that the information that the detecting hole 41 has been closed, is retrieved. As the obstruction member 42 is, firmly positioned in its lower position by the force of the spring 50, the obstruction member 42 is never pushed up by the detecting pin 46 so as to disengage the positioning projection 43a from the positioning recess 45b, thereby avoiding inadvertent raising of the obstruction member. Thus, the obstruction member 42 can always firmly press down the detecting pin 46 against the elastic force acting on the latter.

Next, when the obstruction member 42 is raised to its upper position against the force of the spring 50 as shown in FIG. 6B, the mouth of the detecting hole 41 opening through the bottom plate 2a and the side plate 2b is simultaneously opened. At such time, the positioning projection 43a is disengaged from the lower positioning recess 45b, and resiliently engages with the upper positioning recess 45a, so that the obstruction member 42 is located and held in its upper position. The obstruction member 42 can be raised to the upper position by pushing up the horizontal plate 42.

When the tape cassette is mounted in the video tape recorder with its detecting hole 41 opened, the detecting pin 46 is not pressed down, by rather, is fitted into the detecting hole 41, so that the information that the detecting hole 41 has been opened, is retrieved. The obstruction member 42 can smoothly move up and down between the two described positions as the guide pin 49 is guided by the guide bore 48.

Next, a third embodiment of this invention will be described hereinafter according to FIGS. 7A, 7B, 8A and 8B.

A first U-shaped notch 51 opens at the upper edge of the side plate 2b of the lower half 2 and a second U-shaped notch 52 depends from the bottom of the first U-shaped notch 51. The second notch 52 communicates with the detecting hole 41 at a side thereof. Further, the width $W_1$ of the first notch 51 is substantially equal to the width $W_2$ of the detecting hole 41, and the width $W_3$ of the second notch 52 is smaller than the width $W_2$ of the detecting hole 41.

Two spaced apart steps 51a which are defined at the bottom of the first notch 51 and are separated by open top of the second notch 52, are lower, by the height $H_4$ than the lower face 36a of the pedestal 36, and a projection or tab 53 formed integrally with the upper half 1 and projecting downwards from the side plate or flange 1b of the upper half 1, is fitted into the first notch 51. The lower edge 53a of the projection 53 abuts against the steps 51a, so that the opening at the top of the second U-shaped notch 52 is closed by the lower edge 53a.

Further, a stop 54 in the form of a horizontally elongate projection is formed integrally with the obstruction member 42 at the outer lower side of the vertical plate 42b thereof, and the stop 54 is fitted in the second notch 52 so as to be movable up and down between the lower edge 53a of the projection 53 of the upper half 1 and the flat bottom 52a of the second notch 52 of the lower half 2.

Incidently, the obstruction member 42 is fitted into the detecting hole 41 before the upper half 1 and the lower half 2 are connected or assembled together. That is, the horizontal plate 42a of the obstruction member 42 is horizontally inserted in the detecting hole 41 in the direction of the arrow A in the first place as indicated in chain-dotted lines in FIG. 8A through the gap of height $H_4$ so as to make the vertical plate 42b fit in the inner side of the side plate 2b of the lower half 2, and then, the obstruction member 42 is vertically lowered in the direction of the arrow B to the position indicated in solid lines in FIG. 8A so as to make the stop 54 fit in the second notch 52. After the stop 54 is made to abut against the bottom 52a of the second notch 52, the upper half 1 and the lower half 2 are connected and fastened with screws, as at 26 on FIG. 9. As a result, the projection 53 of the upper half 1 is neatly fitted in the first notch 51, so that the obstruction member 42 being movable up and down within the detecting hole 41.

Thus, when the obstruction member 42 is lowered to the lower position as shown in FIG. 8A, the mouth of the detecting hole 41 opening through the bottom plate 2a and the side plate 2b is closed by the horizontal plate 42a and the vertical plate 42b. At such time, the positioning projection 43a resiliently engages with the lower positioning recess 45b, and the other positioning projection 43b and the stop 54 are captured by the top face 37a of the upright projection 37 and the bottom 52a of the second notch 52, respectively. Hence, the obstruction member 42 is firmly positioned in its lower position and can not be removed downwardly from the detecting hole 41. The obstruction member 42 can be lowered by catching the stop 54 with the user's finger nails or the like.

When the tape cassette is mounted in the video tape recorder with its detecting hole 41 has been closed by the obstruction member 42, the detecting pin 46 in the video tape recorder is resiliently pressed down by the horizontal plate 42a of the obstruction member 42, so that information that the detecting hole 41 has been closed, is retrieved.

Next, when the obstruction member 42 is raised to its upper position as shown in FIG. 8B, the mouth of the detecting hole 41, the horizontal portion of which opens through the bottom plate 2a and the vertical portion of which opens through the second notch 52 communicating with the detecting hole 41, is simultaneously opened. At such time, the positioning projection 43a is disengaged from the lower positioning recess 45b, and resiliently engages with the upper positioning recess 45a, and the stop 54 is captured by the lower edge 53a of the projection 53, so that the obstruction member 42 is firmly located in its upper position. The obstruction member 42 can be raised to the upper position by pushing up the horizontal plate 42a.

When the tape cassette is mounted in the video tape recorder with its detecting hole 41 opened, the detecting pin 46 is not pressed down, but fits into the detecting hole 41, so that information that the detecting hole 41 has been opened, is retrieved.

According to the third embodiment, even if the obstruction member 42 located in its upper position is forceably lowered, the obstruction member 42 is prevented from being further lowered after the stop 54 comes in contact with the bottom 52a of the second notch 52 as shown in FIG. 8A. Therefore, the obstruction member 42 cannot be removed from the detecting hole 41 after the upper half 1 and the lower half 2 are fastened to each other.

Having described three illustrative embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape cassette comprising:
    a casing for accommodating a pair of reels around which a tape is wound and having a front opening across which the tape is guided between the reels, said casing including upper and lower halves respectively defining top and bottom walls of the casing;
    a lid mounted on said casing for movement between an opened position uncovering said front opening and a closed position covering said front opening;
    a pedestal structure in said lower half of the casing having a raised portion which is elevated in respect to said bottom wall for defining a cavity underlying said raised portion and a support surface on said raised portion;
    a mounting pin projecting upwardly from said support surface of the pedestal;
    a lid-locking member pivoted on said mounting pin and including means engageable with said lid for locking said lid in said closed position, and means engageable by a lock-releasing member of a tape cassette apparatus for pivoting said lid-locking member so as to release said lid for movement to said opened position;
    said casing further having a detecting hole opening at least through said bottom wall into said cavity under said raised portion of the pedestal structure; and
    an indicating member movable within said cavity for indicating a characteristic of the tape in the respective tape cassette by the position of said indicating member within said cavity in respect to said detecting hole.

2. The tape cassette according to claim 1; wherein said indicating member is movable rectilinearly up and down relative to said casing between positions within said cavity in which said detecting hole is opened and closed, respectively.

3. The tape cassette according to claim 2; further comprising cooperative retaining means on said indicating member and said casing, respectively, for releasably holding said indicating member in each of said positions for opening and closing said detecting hole.

4. The tape cassette according to claim 3; wherein said mounting pin has an axial bore therein opening downwardly through said pedestal into said cavity, and said indicating member includes a guide pin directed upwardly therefrom and being slidably received in said bore of the mounting pin for guiding said indicating member in its up and down movements.

5. The tape cassette according to claim 3; further comprising biasing means urging said indicating member to said position for closing said detecting hole.

6. The tape cassette according to claim 2; wherein said detecting hole also has a portion opening laterally from said cavity through an adjacent side wall of said casing, and said indicating member includes bottom and side portions which, in said position for closing said detecting hole, substantially occlude the portions of said detecting hole opening through said bottom and side walls, respectively, of said casing.

7. The tape cassette according to claim 6; wherein said portion of the detecting hole opening laterally through said side wall has a bar-like part of said side wall extending across its bottom end, and said side portion of the indicating member has a stop member projecting outwardly therefrom and being engageable with said bar-like part of the side wall for preventing downward removal of said indicating member from said cavity through said detecting hole.

8. The tape cassette according to claim 7; wherein said portion of the detecting hole opening laterally through said side wall has parallel opposed side edges, and said stop member is longitudinally dimensioned to slidably engage, at its ends, against said parallel opposed side edges for guiding said indicating member in its up and down movements.

9. The tape cassette according to claim 8; wherein said upper and lower halves of the casing have respective peripheral flanges abutting to define said side wall when said upper and lower halves are assembled together, said portion of the detecting hole opening through said side wall is formed in said flange of the lower half of the casing and extends to the edge of the respective flange so that said indicating member can be installed in said detecting hole from above prior to the assembling together of said upper and lower halves, and said flange of the upper half of the casing has a portion for blocking the upper end of said portion of the detecting hole opening through said side wall when the upper and lower halves of the casing are assembled together, thereby to be engageable by said stop member for preventing upward removal of said indicating member above said position in which the detecting hole is opened.

* * * * *